(12) United States Patent
Zernik

(10) Patent No.: US 9,424,465 B2
(45) Date of Patent: *Aug. 23, 2016

(54) DEVICE, SYSTEM AND METHOD FOR IDENTIFYING SECTIONS OF DOCUMENTS

(71) Applicant: Uri Zernik, Palo Alto, CA (US)

(72) Inventor: Uri Zernik, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/678,958

(22) Filed: Apr. 4, 2015

(65) Prior Publication Data

US 2015/0213314 A1     Jul. 30, 2015

Related U.S. Application Data

(63) Continuation of application No. 13/644,340, filed on Oct. 4, 2012, now Pat. No. 9,001,390.

(60) Provisional application No. 61/543,836, filed on Oct. 6, 2011.

(51) Int. Cl.
*H04N 1/40*     (2006.01)
*G06K 9/00*     (2006.01)

(52) U.S. Cl.
CPC .............. *G06K 9/00463* (2013.01); *H04N 1/40* (2013.01)

(58) Field of Classification Search
None
See application file for complete search history.

(56) References Cited

U.S. PATENT DOCUMENTS

| | | | |
|---|---|---|---|
| 5,434,962 A | 7/1995 | Kyojima et al. | |
| 6,510,425 B1 | 1/2003 | Okamoto et al. | |
| 6,907,431 B2 | 6/2005 | Lin | |
| 7,260,773 B2 | 8/2007 | Zernik | |
| 7,668,865 B2 | 2/2010 | McDonald | |
| 7,743,327 B2 | 6/2010 | Meunier et al. | |
| 7,853,866 B2 | 12/2010 | Tanaka | |
| 7,937,338 B2 | 5/2011 | Boguraev et al. | |
| 9,001,390 B1 | 4/2015 | Zernik | |
| 2003/0042319 A1 | 3/2003 | Moore | |
| 2003/0079183 A1* | 4/2003 | Tada | G06F 17/241 715/209 |
| 2005/0050459 A1 | 3/2005 | Qu et al. | |
| 2013/0198123 A1* | 8/2013 | Stadermann | G06K 9/00463 706/46 |

* cited by examiner

*Primary Examiner* — Dung Tran
(74) *Attorney, Agent, or Firm* — Jay R. Yablon

(57) ABSTRACT

A method for identifying sections of contracts. This method works well with documents that originated from scanned images, i.e., documents that could possibly include noise and misleading cues.

18 Claims, 5 Drawing Sheets

Section 1. Definitions 1.1 Confidential Information 1.2 Deliverables (i)

(ii)

(iii)

1.3 Mimsies (iv)

(v)

Section 2. Master Plan

:'( CONTRACTOR AGREEMENT
:'( This Contractor Agreement (the "Agreement") is entered into as of August 1, 2013 (the "Effective Date") between Isabella, Inc. ("Company") and the person designated below as "Contractor".
:'( 14
:'( Section 1. Definitions. As used in this Agreement:
:'( 1.1 "Confidential Information". These mean any and all information related to a party's business, financial data, and proprietary information of three
:'( (3) parties provided that is (i) labeled or
:'( identified as "confidential" or "proprietary"; (ll) that a the receiving party otherwise knows, or would reasonably be expected to know, on August
:'( 15, 2010 or considers to be confidential or proprietary; or (iii) has a duty to treat as confidential.
:'( 1
:'( !
:'( 1.2 "Deliverables" These mean the items to be provided by Contractor to Company under this Agreement, including items specifically designated
:'( 1.3 "Mimsies". These mean unidentified objects.
:'( (iv) more stuff, (v) even more. See for example
:'( Section 2 below.
:'( Section 2. Master Plan. The master plan should be clear while
:'( 6.1 is too high for our purposes. It should never be verballed or illustrated.

Figure 1

<title>CONTRACTOR AGREEMENT</title>
This Contractor Agreement (the "Agreement") is entered into as of August 1, 2013 (the "Effective Date") between Isabella, Inc. ("Company") and the person designated below as "Contractor".
14
<section lev=1 seq=1 sn=1><sn>Section 1.</sn> Definitions.</section> As used in this Agreement:
<section lev=2 seq=2 sn=1><sn>1.1</sn> "Confidential Information"</section> means any and all information related to a party's business, financial data, and proprietary information of three (3) parties provided that is <section lev=3 seq=3 sn=1><sn>(i)</sn></section> labeled or identified as "confidential" or "proprietary"; <section lev=3 seq=3 sn=2><sn>(ll)</sn></section> that a the receiving party otherwise knows, on August 15, 2010 or would reasonably be expected to know, or considers to be confidential or proprietary; or <section lev=3 seq=3 sn=3><sn>(iii)</sn></section> has a duty to treat as confidential.
1
!
<section lev=2 seq=2 sn=2><sn>1.2</sn> "Deliverables"</section> means the items to be provided by Contractor to Company under this Agreement, including items specifically designated
<section lev=2 seq=2 sn=3><sn>1.3 "Mimsies"</section>. These mean unidentified objects.
<section lev=3 seq=4 sn=1><sn>(iv)</section> more stuff <section lev=3 seq=4 sn=2><sn>(v)</section> even more. See for example
Section 2 below.
<section lev=1 seq=1 sn=2><sn>Section 2.</sn> Master Plan.</section> The master plan should be clear while
6.1 is too high for our purposes. It should never be verballed or illustrated.

Figure 2

CONTRACTOR AGREEMENT
This Contractor Agreement (the "Agreement") is entered into as of August 1, 2013 (the "Effective Date") between Isabella, Inc. ("Company") and the person designated below as "Contractor".
14
Section 1. Definitions. As used in this Agreement:
1.1 "Confidential Information". These mean any and all information related to a party's business, marketing plans, customer and supplier lists, financial data, and proprietary information of
(3) three parties provided that is (i) labeled or identified as "confidential" or "proprietary"; (ll) that a the receiving party otherwise knows, on August
15, 2010 or would reasonably be expected to know, or considers to be confidential or proprietary; or (iii) has a duty to treat as confidential.
1
!
1.2 "Deliverables". These mean the items to be provided by Contractor to Company under this Agreement, including items specifically designated
1.3 "Mimsies". These mean unidentified objects. (iv) more stuff (v) even more. See for example Section 2 below.
Section 2. Master Plan. The master plan should be clear while
6.1 is too high for our purposes. It should never be verballed or illustrated.

Figure 3

Section 1. Definitions
1.1 Confidential Information
1.2 Deliverables
(i)
(ii)
(iii)
1.3 Mimsies
(iv)
(v)
Section 2. Master Plan

Figure 4

CONTRACTOR AGREEMENT
:'( This Contractor Agreement (the "Agreement") is entered into as of August 1, 2013 (the "Effective Date") between Isabella, Inc. ("Company") and the person designated below as "Contractor".
:'( 14
:'( Section 1. Definitions. As used in this Agreement:
:'( 1.1 "Confidential Information". These mean any and all information related to a party's business, financial data, and proprietary information of three
:'( (3) parties provided that is (i) labeled or
:'( identified as "confidential" or "proprietary"; (ll) that a the receiving party otherwise knows, or would reasonably be expected to know, on August
:'( 15, 2010 or considers to be confidential or proprietary; or (iii) has a duty to treat as confidential.
:'( 1
:'( !
:'( 1.2 "Deliverables" These mean the items to be provided by Contractor to Company under this Agreement, including items specifically designated
:'( 1.3 "Mimsies". These mean unidentified objects.
:'( (iv) more stuff, (v) even more. See for example
:'( Section 2 below.
:'( Section 2. Master Plan. The master plan should be clear
:'( 6.1 is too high for our purposes. It should never be verballed or illustrated.

Figure 5

DEVICE, SYSTEM AND METHOD FOR IDENTIFYING SECTIONS OF DOCUMENTS

CROSS-REFERENCE TO RELATED APPLICATIONS

This application is a continuation of application U.S. Ser. No. 13/644,340 filed Oct. 4, 2012 now U.S. Pat. No. 9,001, 390 issued Apr. 7, 2015, which in turn claims benefit of provisional application U.S. 61/543,836 filed Oct. 6, 2011.

SUMMARY OF THE INVENTION

This is a method for identifying sections of documents, especially contracts. This method works well with documents that originated from scanned images, i.e., documents that could possibly include noise and misleading cues.

Many times a contract is available to us as plain text, with no annotations and no table of contents. For four objectives it would be advantageous to be able to tag the section headings.

1. The document becomes readable when the section headings are highlighted.
2. The document is comprehensible when the table of contents is laid out upfront.
3. The document is more accessible when the reader can click on the table of contents and reach the desirable section.
4. The document is navigable when the reader can click on "see Section 3.2(b)" and get into the intended section.

A novel and inventive method is presented here for marking up the section markers and the section headers of a document, which method is readily embodied in computerized devices and systems comprising computerized storage, processing and programming embodied on a non-transitory computerized storage medium.

An example of a "dirty" document in three formats appears below.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) summarized below.

FIG. 1 illustrates a sample input document which is unmarked, to be operated on in accordance with the device, system and method of the invention.

FIG. 2 illustrates the sample input document of FIG. 1, after the invention has embedded several tags into the document.

FIG. 3 illustrates the sample input document of FIG. 1, as it is presented to the reader/user after the invention has fully processed the document and identified its sections.

FIG. 4 illustrates the table of contents which is generated by the invention after the sample input document of FIG. 1 has been fully processed its sections identified.

FIG. 5 illustrates the sample input document of FIG. 1 during its processing, with candidate markers identified.

DETAILED DESCRIPTION

Example Document

I. The Input Unmarked Document

Tagging Section Markers and Generating a Table of Contents
As shown below and in FIG. 1, the document is obtained as a string of characters where "end of line" is given as a distinct character (:'( ) Notice that this document includes some spurious characters (14, !, 1). Also notice that the section 1.2 is written as 1.2 due to a typical OCR error.
:'(CONTRACTOR AGREEMENT
:'(This Contractor Agreement (the "Agreement") is entered into as of August 1, 2013 (the "Effective Date") between Isabella, Inc. ("Company") and the person designated below as "Contractor".
:'(14
:'(Section 1. Definitions. As used in this Agreement:
:'(1.1 "Confidential Information". These mean any and all information related to a party's business, financial data, and proprietary information of three
:'((3) parties provided that is (i) labeled or
:'(identified as "confidential" or "proprietary"; (ll) that a the receiving party otherwise knows, or would reasonably be expected to know, on August
:'(15, 2010 or considers to be confidential or proprietary; or (iii) has a duty to treat as confidential.
:'(1
:'(!
:'(1.2 "Deliverables" These mean the items to be provided by Contractor to Company under this Agreement, including items specifically designated
:'(1.3 "Mimsies". These mean unidentified objects.
:'((iv) more stuff, (v) even more. See for example
:'(Section 2 below.
:'(Section 2. Master Plan. The master plan should be clear while
:'(6.1 is too high for our purposes. It should never be verballed or illustrated.

II. The Generated Tagged Document

Below, and in FIG. 2, are shown the embedded tags. Each section bracket indicates the level # (lev) sequence # (seq), and the serial number (sn) of the item.
<title>CONTRACTOR AGREEMENT</title>
This Contractor Agreement (the "Agreement") is entered into as of August 1, 2013 (the "Effective Date") between Isabella, Inc. ("Company") and the person designated below as "Contractor".
14
<section lev=1 seq=1 sn=1><sn>Section 1.</sn> Definitions.</section> As used in this Agreement:
<section lev=2 seq=2 sn=1><sn>1.1</sn> "Confidential Information"</section> means any and all information related to a party's business, financial data, and proprietary information of three (3) parties provided that is <section lev=3 seq=3 sn=1><sn>(i)</sn></section> labeled or identified as "confidential" or "proprietary"; <section lev=3 seq=3 sn=2><sn>(ll)</sn></section> that a the receiving party otherwise knows, on August 15, 2010 or would reasonably be expected to know, or considers to be confidential or proprietary; or <section lev=3 seq=3 sn=3><sn>(iii)</sn></section> has a duty to treat as confidential.
1
!
<section lev=2 seq=2 sn=2><sn>1.2</sn>"Deliverables"</section> means the items to be provided by Contractor to Company under this Agreement, including items specifically designated
<section lev=2 seq=2 sn=3><sn>1.3 "Mimsies"</section>. These mean unidentified objects.
<section lev=3 seq=4 sn=1><sn>(iv)</section> more stuff <section lev=3 seq=4 sn=2><sn>(v)</section>even more. See for example
Section 2 below.
<section lev=1 seq=1 sn=2><sn>Section 2.</sn> Master Plan.</section> The master plan should be clear while 6.1 is too high for our purposes. It should never be verballed or illustrated.

III. The Presented Highlighted Document

Below and in FIG. 3 is the document that is presented to the reader. See how the highlighted section headers make reading easy.

Note that the extraneous numbers, some introduced by OCR errors and some by the text itself, are successfully ignored by the disclosed method.

Notice that the OCR errors, although accounted for by the method, are not thrown out. This is not the objective of this method.

CONTRACTOR AGREEMENT

This Contractor Agreement (the "Agreement") is entered into as of August 1, 2013 (the "Effective Date") between Isabella, Inc. ("Company") and the person designated below as "Contractor".
14
Section 1. Definitions. As used in this Agreement:
1.1 "Confidential Information". These mean any and all information related to a party's business, marketing plans, customer and supplier lists, financial data, and proprietary information of
(3) three parties provided that is (i) labeled or identified as "confidential" or "proprietary"; (ll) that a the receiving party otherwise knows, on August
15, 2010 or would reasonably be expected to know, or considers to be confidential or proprietary; or (iii) has a duty to treat as confidential.
1
!
1.2 "Deliverables". These mean the items to be provided by Contractor to Company under this Agreement, including items specifically designated
1.3 "Mimsies". These mean unidentified objects. (iv) more stuff (v) even more. See for example Section 2 below.
Section 2. Master Plan. The master plan should be clear while 6.1 is too high for our purposes. It should never be verballed or illustrated.

In addition, the method generates and presents the user with the following table of contents that corresponds with the section markers identified in the document, set forth below and in FIG. 4.
Section 1. Definitions
1.1 Confidential Information
1.2 Deliverables
(i)
(ii)
(iii)
1.3 Mimsies
(iv)
(v)
Section 2. Master Plan
3. The Method
The method which leads to the table of contents shown above comprises six steps:
3.1. Identify Potential Section Markers that Appear at the Beginning of a Line.

Section markers could come in 3 types (or combinations of the types) as shown below.

1. letter and number indicators: e.g., (a), B, aa (for the following sequence: x, y, z, aa, bb . . . ), ggg, [c], {xx}, 11, (i), II, VI, 11.2, 23.3.4, I.19(1)(b)—punctuation is universal and parens include [, (, {.

2. section indicators (e.g., "Section 3", "Paragraphs 3.2", "Appendix 17(a)", "Article II")—section headers are given as an input table.

3. in-line mini-sections: (i), (ll), (iii), (1), (2), (a), (b), (c), (i), (ii), (iii)—These items are captured even in mid-line. They are not very significant for the reader, however, they must be accounted for the prevent spurious errors (e.g., we can deduce that (iv) above is not a section but an in-line).

At this point, to overcome OCR errors (1, l, and i are interchangeable by OCR), we count each one of 1, i, and l in 5 possible types (numeral 1, small letter l or i, small roman l or i). There are some other common substitutions which can be provided as a table.

In the document below, which is also shown in FIG. 5, we highlighted in underlining the candidate markers identified in the document.

Note that while a person can "see" that "Section 2 below" is a reference and "Section 2. Master Plan" is a legitimate marker, for a computer program this distinction is not trivial.
Contractor Agreement
:'(This Contractor Agreement (the "Agreement") is entered into as of August 1, 2013 (the "Effective Date") between Isabella, Inc. ("Company") and the person designated below as "Contractor".
:'(14
:'(Section 1. Definitions. As used in this Agreement:
:'(1.1 "Confidential Information". These mean any and all information related to a party's business, financial data, and proprietary information of three
:'((3) parties provided that is (i) labeled or
:'(identified as "confidential" or "proprietary"; (ll) that a the receiving party otherwise knows, or would reasonably be expected to know, on August
:'(15, 2010 or considers to be confidential or proprietary; or (iii) has a duty to treat as confidential.
:'(1
:'(!
:'(1.2 "Deliverables" These mean the items to be provided by Contractor to Company under this Agreement, including items specifically designated
:'(1.3 "Mimsies". These mean unidentified objects.
:'((iv) more stuff, (v) even more. See for example
:'(Section 2 below.
:'(Section 2. Master Plan. The master plan should be clear
:'(6.1 is too high for our purposes. It should never be verballed or illustrated.

Here is the list of section markers then extracted into an array:
1. 14
2. Section 1.
3. 1.1
4. (3)
5. (i)
6. (II)
7. 15

8. (iii)
9. 1
10. 1.2
11. 1.3
12. (iv)
13. (v)
14. Section 2
15. Section 2.
16. 6.1

3.2. List Similar Types of Potential Section Markers:

In the example above we next identify four similar marker types:
1. 14, 15, 1
2. Section 1, Section 2, Section 2.
3. 1.1, 1.2, 1.3, 6.1—1.2 is interpreted as 1.2
4. (3)
5. (i), (ll), (iii), (iv), (v)—(ll) is interpreted as (ii)

3.3. Eliminate Section References, Dates, Page Numbers and other Extraneous Numbers We next need to distinguish between references and section markers, and weed out the references. There are three examples of this in the document above:

"See Section 2 Below". Obviously "Section 2" here is not a section marker but a section reference and hence it is weeded out.

"August 15, 2010". Obviously "15" here is not a section marker but a part of a date "three (3)". Obviously, "(3)" here is the elaboration of the number "three".

3.4. Identify Sequences:

Based on understanding numbers, letters, roman numerals and their numerical values, we identify four legitimate sequences, and one illegitimate sequence (it's not good numbering):
1. illegitimate: 14, 1
2. legitimate: Section 1, Section 2
3. legitimate: 1.1, 1.2, 1.3
4. legitimate: (i), (ll), (iii), (iv), (v)
5. legitimate: 6.1

Single-item sequences are eliminated unless they are complex ones such as 6.1 which will be tested later on for successful inclusion relations.

3.5. Identify Structures with Inclusion Relations:
Based on the location of the items we have four structures, with the following inclusion relations:
1. top sequence: Section 1, Section 2
2. inside seq 1, sn 1: 1.1, 1.2, 1.3
3. inside seq 2, sn 2: (i), (ll), (iii)
4. inside seq 2, sn 3: (iv), (v)—although it is a natural continuation of structure number 3, we split it since it has a different inclusion relation (seq2, sn3 vs. seq2, sn2)
5. inside seq 1, sn 2: 6.1—illegitimate. It is included under Section 2 so it must start with a 2(2.1 vs 6.1)

3.6. Generate the Table of Contents
Based on the relations in Section 3.5 above we can now generate the table of contents:
Section 1. Definitions
1.1 Confidential Information
1.2 Deliverables
(i)
(ii)
(iii)
1.3 Mimsies
(iv)
(v)

Section 2. Master Plan

The knowledge possessed by someone of ordinary skill in the art at the time of this disclosure is understood to be part and parcel of this disclosure and is implicitly incorporated by reference herein, even if in the interest of economy express statements about the specific knowledge understood to be possessed by someone of ordinary skill are omitted from this disclosure. While reference may be made in this disclosure to the invention comprising a combination of a plurality of elements, it is also understood that this invention is regarded to comprise combinations which omit or exclude one or more of such elements, even if this omission or exclusion of an element or elements is not expressly stated herein, unless it is expressly stated herein that an element is essential to applicant's combination and cannot be omitted. It is further understood that the related prior art may include elements from which this invention may be distinguished by negative claim limitations, even without any express statement of such negative limitations herein. It is to be understood, between the positive statements of applicant's invention expressly stated herein, and the prior art and knowledge of the prior art by those of ordinary skill which is incorporated herein even if not expressly reproduced here for reasons of economy, that any and all such negative claim limitations supported by the prior art are also considered to be within the scope of this disclosure and its associated claims, even absent any express statement herein about any particular negative claim limitations.

Finally, while only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

I claim:

1. A method for determining document structure, comprising using computerized storage, processing and programming embodied on a non-transitory computerized storage medium for:

identifying potential section markers of an input document;

identifying similar types of said potential section markers;

distinguishing between references and section markers and weeding out references, thereby identifying real section markers among said potential section markers;

said computerized programming automatically identifying legitimate and illegitimate numbering sequences, lettering sequences, or combined numbering and lettering sequences of said real section markers without operator intervention;

said computerized programming automatically identifying structural inclusion relations among said real section markers which are identified to adhere to said legitimate numbering sequences, lettering sequences, or combined numbering and lettering sequences without operator intervention; and said computerized programming automatically generating a structured table of contents from said real, legitimately-sequenced section markers without operator intervention.

2. The method of claim 1, said potential section markers comprising letter indicators, number indicators, or both; section indicators; and in-line mini-section indicators.

3. The method of claim 2, said identifying similar types of said potential section markers comprising comparing and segregating said letter indicators, number indicators, or both, section indicators and in-line mini-section indicators of similar type.

4. The method of claim 3, said weeding out references comprising determining by context that a potential section marker is not in fact acting as a heading to a section, and therefore identifying said potential section marker as a reference and not a real section marker.

5. The method of claim 4, said identifying legitimate and illegitimate numbering/lettering sequences comprising comparing all of the real section markers of a given type to determine if their numbering sequence, lettering sequence, or combined numbering and lettering sequence is in fact a legitimate, ordered sequence; and segregating legitimate sequences from illegitimate sequences.

6. The method of claim 5, said identifying structural inclusion relations comprising determining hierarchical relationships among said real, legitimately-sequenced section markers.

7. A structured table of contents product-by-process in the form of computerized text produced by a computerized device and represented in a non-transitory computerized storage medium, produced by a method for determining document structure, said method comprising:
 identifying potential section markers of an input document;
 identifying similar types of said potential section markers;
 distinguishing between references and section markers and weeding out references, thereby identifying real section markers among said potential section markers;
 said computerized device identifying legitimate and illegitimate numbering sequences, lettering sequences, or combined numbering and lettering sequences of said real section markers without operator intervention;
 said computerized device identifying structural inclusion relations among said real section markers which are identified to adhere to said legitimate numbering sequences, lettering sequences, or combined numbering and lettering sequences without operator intervention; and
 said computerized device generating a structured table of contents from said real, legitimately-sequenced section markers without operator intervention.

8. The product-by-process of claim 7, said method further comprising said potential section markers comprising letter indicators, number indicators, or both; section indicators; and in-line mini-section indicators.

9. The product-by-process of claim 8, said method further comprising said identifying similar types of said potential section markers comprising comparing and segregating said letter indicators, number indicators, or both, section indicators and in-line mini-section indicators of similar type.

10. The product-by-process of claim 9, said method further comprising said weeding out references comprising determining by context that a potential section marker is not in fact acting as a heading to a section, and therefore identifying said potential section marker as a reference and not a real section marker.

11. The product-by-process of claim 10, said method further comprising said identifying legitimate and illegitimate numbering/lettering sequences comprising comparing all of the real section markers of a given type to determine if their numbering sequence, lettering sequence, or combined numbering and lettering sequence is in fact a legitimate, ordered sequence; and segregating legitimate sequences from illegitimate sequences.

12. The product-by-process of claim 11, said method further comprising said identifying structural inclusion relations comprising determining hierarchical relationships among said real, legitimately-sequenced section markers.

13. An apparatus for determining document structure, comprising computerized storage, processing and programming embodied on a non-transitory computerized storage medium for:
 identifying potential section markers of an input document;
 identifying similar types of said potential section markers;
 distinguishing between references and section markers and weeding out references, thereby identifying real section markers among said potential section markers;
 said computerized programming automatically identifying legitimate and illegitimate numbering sequences, lettering sequences, or combined numbering and lettering sequences of said real section markers without operator intervention;
 said computerized programming automatically identifying structural inclusion relations among said real section markers which are identified to adhere to said legitimate numbering sequences, lettering sequences, or combined numbering and lettering sequences without operator intervention; and
 said computerized programming automatically generating a structured table of contents from said real, legitimately-sequenced section markers without operator intervention.

14. The apparatus of claim 13, said potential section markers comprising letter indicators, number indicators, or both; section indicators; and in-line mini-section indicators.

15. The apparatus of claim 14, said identifying similar types of said potential section markers comprising comparing and segregating said letter number indicators, number indicators, or both, section indicators and in-line mini-section indicators of similar type.

16. The apparatus of claim 15, said weeding out references comprising determining by context that a potential section marker is not in fact acting as a heading to a section, and therefore identifying said potential section marker as a reference and not a real section marker.

17. The apparatus of claim 16, said identifying legitimate and illegitimate numbering/lettering sequences comprising comparing all of the real section markers of a given type to determine if their numbering sequence, lettering sequence, or combined numbering and lettering sequence is in fact a legitimate, ordered sequence; and segregating legitimate sequences from illegitimate sequences.

18. The apparatus of claim 17, said identifying structural inclusion relations comprising determining hierarchical relationships among said real, legitimately-sequenced section markers.

* * * * *